United States Patent

Kálal et al.

[11] 4,089,823
[45] May 16, 1978

[54] ALDEHYDE POLYMERS FROM PERIODIC ACID TREATMENT OF EPOXIDE POLYMERS

[75] Inventors: Jaroslav Kálal, Prague; František Švec, Kladno, both of Czechoslovakia

[73] Assignee: Ceskoslovenska akademie ved, Prague, Czechoslovakia

[21] Appl. No.: 679,024

[22] Filed: Apr. 21, 1976

[30] Foreign Application Priority Data

May 6, 1975  Czechoslovakia ............... 3139-75

[51] Int. Cl.² ............................................ C08F 8/06
[52] U.S. Cl. ...................... 260/23 EP; 260/67 UA;
    526/13; 526/15; 526/16; 526/57; 526/273
[58] Field of Search ............ 260/67 UA, 23 EP;
    526/13, 15, 16, 57

[56] References Cited
U.S. PATENT DOCUMENTS 3,770,700  11/1973  Forgione .............................. 260/64

*Primary Examiner*—Stanford M. Levin

[57] ABSTRACT

The invention relates to polymeric materials containing variable amounts of aldehyde groups and comprising the chain units

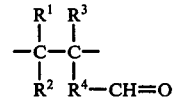

where $R^1$, $R^2$ and $R^3$ are H, $C_1 - C_5$ alkyl, aryl, furyl, halogen, nitrile group or hydroxyl and $R^4$ is $C_1 - C_{20}$ alkylene, arylene, $-COO(CH_2)_n-$, $-O-(CH_2)_n-$, $-COO(CH_2)_nCH(OH)CH_2OCO(CH_2)_m-$ or $-(CH_2)_nOCOR^5COO(CH_2)_m-$ ($n$ and $m$ are integers 0 – 20 and $R^5$ is the single bond, $C_1 - C_{20}$ alkylene or hydroxyalkylene or arylene). The material may be in the form of globules with a measurable specific surface area and is suitable for bonding of biologically active compounds containing primary amino groups or other amines to produce polymeric chelating agents. The invention further relates to the method for preparation the above materials which consists in treatment of the polymeric materials comprising units of the general formula

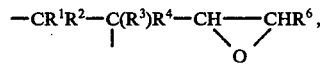

where $R^1$, $R^2$, $R^3$ and $R^4$ have the aforesaid meaning and $R^6$ is H, $C_1 - C_{20}$ alkyl or aryl, with the aqueous solution of periodic acid at 0° – 200° C and the pressure 1 Pa to 20 MPa.

6 Claims, No Drawings

ALDEHYDE POLYMERS FROM PERIODIC ACID TREATMENT OF EPOXIDE POLYMERS

The invention relates to polymeric material which contains variable amount of aldehyde groups and to the method of its preparation by chemical transformation of another polymer. The resulting material is the polymer characterized by the presence of aldehyde groups, the form and structure of which depend on the form and structure of the polymer being modified.

Polymeric materials containing aldehyde groups possess several properties which make them suitable for some special applications. Their most important advantage consists in their easy reaction with primary amino groups on the one hand, and in the possible cleavage of the resulting iminomethylene derivative by changing the reaction conditions on the other. This may be advantageously employed for bonding of biologically active materials for purposes of their separation, purification, immobilization, etc., bonding of chemotherapeutics and antibiotics, bonding of various amines under formation of complex-forming polymers, and in a number of further applications.

Polymeric materials containing free aldehyde groups are recently prepared in several ways. The starting materials are either natural polymers or synthetic monomers. The above mentioned material is prepared, as a rule, from natural polymers by the controlled oxidation of alcohol groups (hydroxyls) which are already present in the polymers. The synthetic way of preparation of the aldehyde polymer may consist in polymerization or copolymerization of suitable acetals, as e.g. N-acryloyl-aminoacetaldehyde dimethylacetal, however their preparation is rather difficult and costly, or in polymerization or copolymerization of suitable unsaturated aldehydes, as e.g. acryladehyde, methacrylaldehyde, cinnamaldehyde, and others.

All refered natural materials have relatively imperfectly defined structure and are attacked ny microorganisms. Copolymers of unsaturated aldehydes have the carbonyl group placed in the immediate vicinity of the polymeric chain, which fact may be in the way in some applications.

These shortcomings are overcome in materials according to this invention and in the method for their preparation.

The invention relates to synthetic polymeric materials containing up to the theoretical amount of aldehyde groups, depending on the type of starting polymer, which are obtained by chemical reaction and contain units of the general formula I

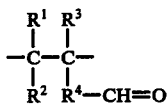  (I), where $R^1$, $R^2$ and $R^3$ are hydrogen, alkyl containing 1 to 5 carbon atoms aryl, halogen, nitrile group, hydroxyl, carboxylic group, and the like, and $R^4$ is the bifunctional group —O—$(CH_2)_n$—, —COO$(CH_2)_m$—COO$(CH_2)_n$CH(OH)CH$_2$OCO$(CH_2)_m$—, —$(CH_2)_n$OCOR$^5$-COO$(CH_2)_m$— (where $n$ and $m$ are integers 0 – 20 and $R^5$ is the covalent single bond, alkylene containing 1 to 20 carbon atoms, or acrylene), alkylene containing 1 to 20 carbon atoms, the covalent single bond or arylene.

The method for preparation of polymeric materials containing aldehyde groups bonded to the above chains, consists in the reaction of the polymeric material comprising units of the general formula II

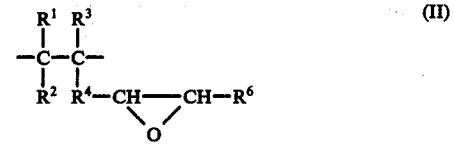  (II)

where $R^1$, $R^2$, $R^3$ and $R^4$ are the substituents defined in the preceding paragraph and $R^6$ is hydrogen alkyl, aryl, or any other group, while hydrogen is most advantageous, with periodic acid in aqueous medium at the temperature 0° – 200° C and the pressure 1 Pa – 20 MPa. The abbreviation Pa is the international designation of pressure units Pascal in the international system as set forth in Pure and Applied Chemistry 21, 1 (1970), the abbreviation M is that for the prefix mega ($10^6$). Thus, 1 MPa is the pressure of $10^6$ Pa (about 10 atm.); and the range 1 Pa – 20 MPa corresponds to $10^{-5}$ to 200 atmospheres. To achieve the high yeild of reaction, it is necessary to use the polymer of the general formula II having the maximum surface area because the reaction proceeds as a rule only on the surface. The large surface area may be obtained e.g. by fine grinding, by the polymerization in the presence of a crosslinking agent and an inert component which yields polymers with large inner surface area, and in other ways. If the starting polymer of the general formula II having a measurable inner surface area is used in the form of spherical particles, the product according to the invention has the same properties and may be employed as a carrier for column applications. The polymeric material obtained by the method according to the invention can be advantageously used without further treatment for various reactions with compounds containing amino groups to obtain a number of further required products.

The invention is further described in examples of performance which illustrate the method but by no means limit the scope of the invention. If other is not stated, the parts and percent given in examples are weight parts and weight percent.

EXAMPLE 1

The 1:1 copolymer of glycidyl methacrylate with ethylene dimethacrylate (100 parts) in the form of spherical particles of diameter 150 – 250 μm and the specific surface area 100 m²/g was refluxed in 1000 parts of water which contained 600 parts of periodic acid for 4 hours. The product separated by washing with water to the neutral reaction and dried contained 5.5% of aldehyde groups. This represents the reaction conversion of 54%.

Example 2

The copolymer of glycidyl acrylate with ethylene dimethacrylate (100 parts), in the form of spherical particles of diameter 20 – 40 μm and the specific surface area 135 m²/g, which underwent the reaction with epoxidized oleic acid, was heated with 300 parts of water and 120 parts of periodic acid to 40° C at the pressure 5 MPa for 1 hour. The product was separated in the same way as in Example 1 and contained 2.8% of aldehyde groups.

Example 3

Poly(glycidyl vinyl phthalate) (100 parts) in the form of powder of grain size below 500 μm was heated with 250 parts of water and 100 parts of periodic acid under reflux for 8 hours. The product after separation and washing contained 4% of aldehyde groups.

Example 4

The polymer used in Example 1 (100 parts) was allowed to react with the solution of 300 parts of periodic acid in 300 parts of water at the temperature 20° C and atmospheric pressure for 100 hours under occasional stirring. The product contained after separation 0.3% of aldehyde groups.

Example 5

The 1:9 copolymer of glycidyl vinyl ether with styrene (100 parts) in the powdered form of the particle size below 150 μm was allowed to react with 250 parts of the solution containing 500 parts of periodic acid in 1000 parts of water under reflux of the mixture for 8 hours. The product contained after separation 1.4% of aldehyde groups.

We claim:

1. Polymeric solid material containing aldehyde groups which comprises units of the general formula I

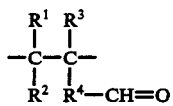

where $R^1$, $R^2$ and $R^3$ are hydrogen, alkyl containing 1 to 5 carbon atoms, aryl, furyl, halogen, or nitrile group and $R^4$ is alkylene containing 1 to 20 carbon atoms, arylene, or one of the following bivalent groups: $-COO(CH_2)_n-$, $-O-(CH_2)_n-$, $-COO(CH_2)_n-CH(OH)-CH_2OCO(CH_2)_m-$, and $-(CH_2)_nOCOR^5COO(CH_2)_m-$, where $n$ and $m$ are integers 0 – 20 and $R^5$ is the covalent single bond, alkylene or hydroxyalkylene containing 1 to 20 carbon atoms, or arylene.

2. Polymeic material as set forth in claim 1 which is in the form of spherical particles of diameter up to 3 mm.

3. Polymeric material as set forth in claim 1 which has a measurable specific surface area.

4. Method for producing polymeric solid material containing aldehyde groups, wherein polymeric material comprising units of the general formula II

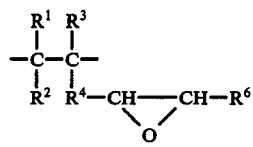

where $R^1$, $R^2$ and $R^3$ are hydrogen, alkyl containing 1 to 5 carbon atoms, aryl, furyl, halogen, hydroxyl, or nitrile group and $R^4$ is alkylene containing 1 to 20 carbon atoms, arylene, $-COO(CH_2)_n-$, $-O-(CH_2)_n-$, $-COO(CH_2)_n-CH(OH)-CH_2OCO(CH_2)_m-$, or $-(CH_2)_nOCOR^5COO(CH_2)_m$, where $n$ and $m$ are integers 0 – 20 and $R^5$ is the covalent single bond, alkylene or hydroxylakylene containing 1 to 20 carbon atoms or arylene, and $R^6$ is hydrogen, alkyl containing 1 to 20 carbon atoms or aryl, is treated with an aqueous solution of periodic acid to produce said material comprising units of the general formula I

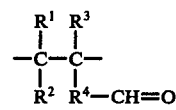

wherein $R^1$, $R^2$, $R^3$ and $R^4$ have the meanings set forth above.

5. Method for producing the polymeric material as set forth in claim 4, wherein the reaction is carried out at the pressure 1 Pa to 20 MPa.

6. Method for producing polymeric materials as set forth in claim 4, wherein the reaction is carried out at the temperature 0° to 200° C.

* * * * *